United States Patent
Huber

(10) Patent No.: US 7,373,062 B2
(45) Date of Patent: May 13, 2008

(54) HOLLOW CORE OPTICAL FIBER

(75) Inventor: Rudolf Huber, Trossingen (DE)

(73) Assignee: TRUMPF LASER GmbH + Co. KG, Schramberg (DE)

(*) Notice: Subject to any disclaimer, the term of this patent is extended or adjusted under 35 U.S.C. 154(b) by 0 days.

(21) Appl. No.: 11/548,127

(22) Filed: Oct. 10, 2006

(65) Prior Publication Data

US 2007/0165991 A1    Jul. 19, 2007

(30) Foreign Application Priority Data

Oct. 7, 2005 (DE) ................. 20 2005 015 728 U

(51) Int. Cl.
*G02B 6/02* (2006.01)

(52) U.S. Cl. .................. 385/125; 385/123; 385/138

(58) Field of Classification Search ............... 385/123, 385/124, 125, 126, 127, 128, 141, 138
See application file for complete search history.

(56) References Cited

U.S. PATENT DOCUMENTS

| | | | | |
|---|---|---|---|---|
| 3,961,283 A * | 6/1976 | Abrams et al. | ............... | 372/64 |
| 4,830,462 A * | 5/1989 | Karny et al. | ............... | 385/31 |
| 5,325,458 A * | 6/1994 | Morrow et al. | ............ | 385/125 |
| 5,434,942 A * | 7/1995 | Jackel et al. | ............... | 385/122 |
| 5,734,765 A * | 3/1998 | Artjushenko et al. | ......... | 385/31 |
| 6,104,853 A * | 8/2000 | Miyagi et al. | .............. | 385/125 |
| 2004/0258381 A1 | 12/2004 | Borrelli et al. | ............ | 385/125 |
| 2005/0195392 A1* | 9/2005 | Uchimura et al. | .......... | 356/246 |
| 2006/0251369 A1* | 11/2006 | Shaw et al. | ................ | 385/125 |

FOREIGN PATENT DOCUMENTS

| | | | | |
|---|---|---|---|---|
| DE | 4212392 | 10/1993 | ............ | 385/125 X |
| DE | 69432598 | 3/2004 | ............ | 385/125 X |
| EP | 1 229 322 | 8/2002 | ............ | 385/125 X |
| EP | 1 255 137 | 11/2002 | ............ | 385/125 X |
| GB | 1 461 400 | 1/1977 | ............ | 385/125 X |
| GB | 2 110 834 | 6/1983 | ............ | 385/125 X |
| JP | 61069005 | 9/1986 | ............ | 385/125 X |
| JP | 01309007 | 12/1989 | ............ | 385/125 X |

OTHER PUBLICATIONS

Search Report and Office Action from corresponding European Patent Application No. EP 06020821.2, mailed Feb. 28, 2007, 6 pages, and English translation of Office Action, 2 pages.

* cited by examiner

*Primary Examiner*—Brian M. Healy
(74) *Attorney, Agent, or Firm*—Fish & Richardson P.C.

(57) ABSTRACT

An optical fiber comprises a hollow fiber core, wherein the front faces of both fiber ends of the hollow fiber core are open and each fiber end is surrounded by a protection element in a dustproof fashion. The protection element includes a window at its front face in front of the fiber end to couple and decouple light to and from the hollow fiber core.

35 Claims, 1 Drawing Sheet

HOLLOW CORE OPTICAL FIBER

CROSS REFERENCE TO RELATED APPLICATION

This application claims priority under 35 U.S.C. §119(a) to German Application No. 20 2005 015 728.7, filed on Oct. 7, 2005, the entire contents of which are hereby incorporated by reference.

TECHNICAL FIELD

The present invention relates to an optical fiber having a hollow fiber core and including a protection element.

BACKGROUND

A hollow core fiber has a hollow fiber core through which light is guided. For this reason, there are no Fresnel reflections at the fiber ends, and the non-linear effects in the glass core that occur in conventional fibers are greatly reduced. The hollow fiber core is generally surrounded by further hollow areas, most of which have a smaller diameter than the fiber core, in order to maintain light guidance in the fiber core.

A very thin hollow fiber core can have a diameter of several µm to several 100 µm. In order to protect the hollow areas of such a thin hollow fiber core, a section without hollow spaces is normally spliced to fibers with hollow cores, or the end piece of the hollow core fiber is collapsed.

SUMMARY

In one general aspect, an optical fiber includes a hollow fiber core including fiber ends and front faces at both fiber ends that are open. At least one fiber end is surrounded by a protection element in a dustproof fashion. The protection element includes a window at its front face in front of the fiber end and separate from the fiber end for coupling in and decoupling the light to be guided through the hollow fiber core.

Implementations can include one or more of the following features. For example, the optical fiber can also include a fiber surrounding the hollow fiber core for guiding the light coupled into the hollow fiber core. The fiber cladding can include hollow spaces that are open at the front faces.

The window of the protection element can have an antireflection coating on one or both sides. The window of the protection element can be flat. The protection element can seal the fiber end in a waterproof fashion. The protection element can seal the fiber end in an air-tight or gas-tight fashion.

The hollow fiber core and any existing hollow spaces of the fiber cladding that are open at their front faces can be filled with gas.

The protection element can have a housing opening that terminates in an intermediate space between the fiber end and the window. The protection element can be made of a material that does not gas out. The distance between the fiber end and the window can be in the mm to cm range.

In another general aspect, an optical fiber system includes a hollow fiber core including fiber ends and front faces of both fiber ends that are open, and a protection element surrounding a fiber end in a dustproof fashion. The protection element includes a window at its front face in front of and separated from the fiber end by a distance for coupling in and decoupling the light to be guided through the hollow fiber core.

Implementations can include one or more of the following features. For example, the optical fiber system can include a fiber cladding surrounding the hollow fiber core for guiding the light coupled into the hollow fiber core. The fiber cladding can include hollow spaces that are open at the front faces.

The window of the protection element can include an antireflection coating on one or both sides. The window of the protection element can be flat. The protection element can seal the fiber end in a waterproof fashion. The protection element can seal the fiber end in an air-tight or a gas-tight fashion.

The hollow fiber core and any existing hollow spaces of the fiber cladding that are open at their front faces can be filled with gas. The protection element can have a housing opening that terminates in an intermediate space between the fiber end and the window. The protection element can be made of a material that does not gas out. The distance between the fiber end and the window can be in the mm to cm range.

In another general aspect, a method of protecting a hollow fiber core of a hollow core optical fiber includes surrounding an open front face of a fiber end of a hollow fiber core, sealing the protection element to the fiber end in a dustproof fashion, and enabling coupling in and decoupling out of light guided through the hollow fiber core through a front face of a window of the protection element that is separated from the fiber open front face by a distance.

Implementations can include one or more of the following features. For example, method can also include surrounding the hollow fiber core with a fiber cladding that guides the light coupled into the hollow fiber core. The method can include forming an antireflection coating on one or both sides of the window of the protection element. The method can include sealing the protection element to the fiber end in a waterproof fashion, in an air-tight fashion, and/or in a gas-tight fashion. The method can include filling the hollow fiber core and any existing hollow spaces of the fiber cladding that are open at their front faces with gas.

The hollow core optical fiber described herein includes hollow spaces (i.e., a hollow core and spaces within a fiber cladding) that are protected in a different way than that of prior hollow core fibers.

The hollow core of the hollow core optical fiber is open at both fiber end front faces, and each fiber end is surrounded by a protection element in a dustproof fashion. The protection element has a window at its front face in front of the fiber end for coupling in and decoupling the light to be guided through the hollow fiber core. The fiber core is preferably surrounded by a fiber cladding for guiding the light coupled therein, the cladding having open hollow spaces at its front face. The distance between the fiber end and the window of the protection element is preferably in the mm to cm range.

The hollow core of the hollow core optical fiber and any existing hollow spaces of the fiber cladding are left open at the fiber end, and each of the two fiber ends is sealed by the protection element. In any event, the protection element seals the fiber end in a dustproof fashion, since dust particles located in the radiation cone close to the fiber end could be drawn towards the stronger radiation field strength and therefore into the hollow fiber core.

In order to prevent disturbing Fresnel reflections at the window of the protection element, both sides of the window are preferably provided with an antireflection coating. The antireflection coating should be suited for all wavelengths to be transmitted (e.g., for a "working laser" at 1064 nm and a "pilot laser" at 630 nm).

The protection element seals the fiber end in a waterproof fashion in order to prevent dew from forming in the fiber. Thus, the hollow core optical fiber with the protection element is less susceptible to soiling, e.g., due to water being drawing into the hollow fiber core and the hollow spaces due to capillary action, and is less likely to be disturbed or stop functioning due to such soiling. Moreover, in the hollow core optical fiber with the protection element, Fresnel reflections are routed or prevented from occurring at the fiber end surfaces, and radiation can be coupled into the fiber core without being severely disturbed.

The protection element can seal the fiber end in an air-tight or gas-tight fashion, such that the hollow core optical fiber can be filled with special gases on a permanent basis in order to change its properties. Helium can, e.g., be used to improve thermal conduction, or SF6 can be used to increase the field strength in the optical fiber.

In another implementation, the hollow core optical fiber can be purged with a dry gas in order to dry any residual moisture. Purging with helium improves heat dissipation from the fiber core area, which may be advantageous when using photonic crystal fibers (PCFs) for fiber lasers. For gas purging, the protection element includes a gas inlet or outlet in the form of a housing opening that terminates in an intermediate space between the fiber end and the window. The housing opening that is used as a gas outlet can be covered by a superfine ceramic filter.

The protection element should be constructed from materials that do not gas out, since gassed-out products could be deposited in the hollow fiber core of the optical fiber and disturb the light guiding properties.

Further advantageous will emerge from the description, the drawings, and the claims. The features mentioned above and below may be used individually or collectively in arbitrary combination. The embodiments shown and described are not to be understood as exhaustive enumeration but have exemplary character for describing the invention.

DETAILED DESCRIPTION

Figure 1:
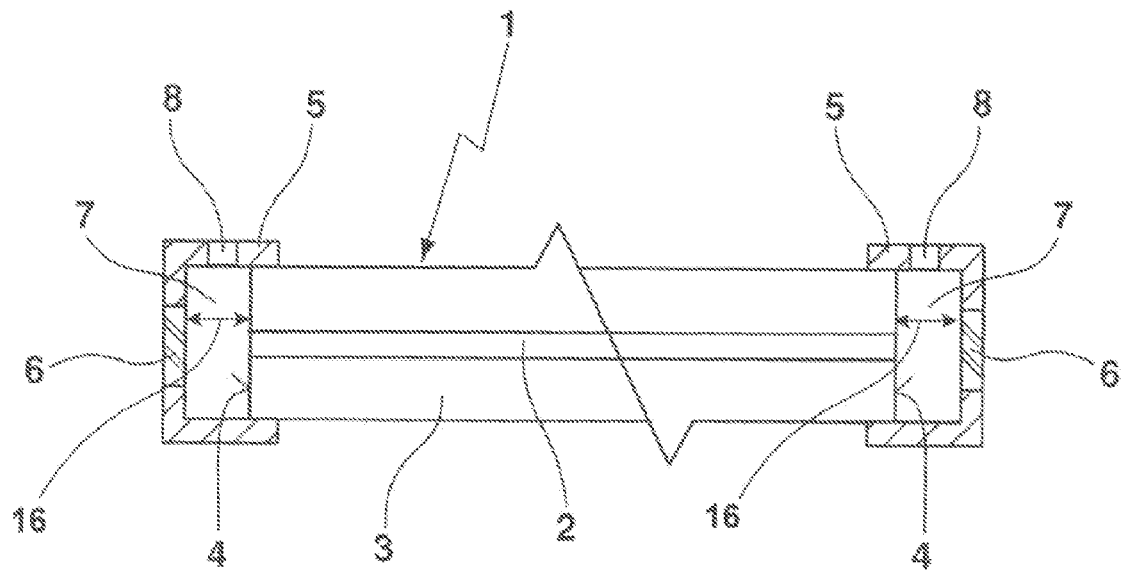
FIG. 1 shows a longitudinal section through a first embodiment of the hollow core optical fiber including a protection element.

The hollow core optical fiber 1 shown in FIG. 1 includes a hollow fiber core 2 and an outer fiber cladding 3 for guiding the light coupled into the fiber core 2. The hollow fiber core 2 is open at the front faces of both fiber ends 4, wherein each fiber end 4 is surrounded by a cap-shaped protection element 5 in a dustproof fashion. That is, the protection element 5 covers the fiber end 4 to define a closed cavity at the fiber end 4 such that dust particles cannot go through the protection element 5 and enter the fiber end 4. For example, the protection element 5 can be coupled to the fiber end 4 with a threaded connection. As another example, the protection element 5 can be coupled to the fiber end 4 with a snap fit connection.

The protection element 5 has a flat window 6 at its front face in front of the fiber end 4, for coupling in and decoupling the light to be guided through the hollow fiber core 2. The protection element 5 consists of a material that does not gas out (e.g., metal or glass). In one implementation, the protection element 5 seals the fiber end 4 in an air-tight or a gas-tight fashion. For example, the protection element 5 can be coupled to the fiber end 4 by sealing with an O-ring or a gasket. The window 6 has an antireflection coating on one or both sides and is separated from the fiber end 4 by a distance 16 that is in the mm to cm range, such that a sealed intermediate space 7 remains between the fiber end 4 and the window 6. The window 6 preferably consists of quartz glass. This antireflection coating of the window 6 should be suited for all wavelengths to be transmitted (e.g., for a "working laser" at 1064 nm and a "pilot laser" at 630 nm).

Each protection element 5 can have a gas inlet or outlet in the form of a housing opening 8 that terminates in the intermediate space 7 in order to purge the hollow fiber core 2 with a purge gas such as a dry gas to dry any residual moisture. Preferably, the housing opening 8, which is used as a gas outlet, is covered by a superfine ceramic filter (not shown). Purging with helium improves heat dissipation from the fiber core area, which can be advantageous when using photonic crystal fibers (PCFs) for fiber lasers.

Figure 2:
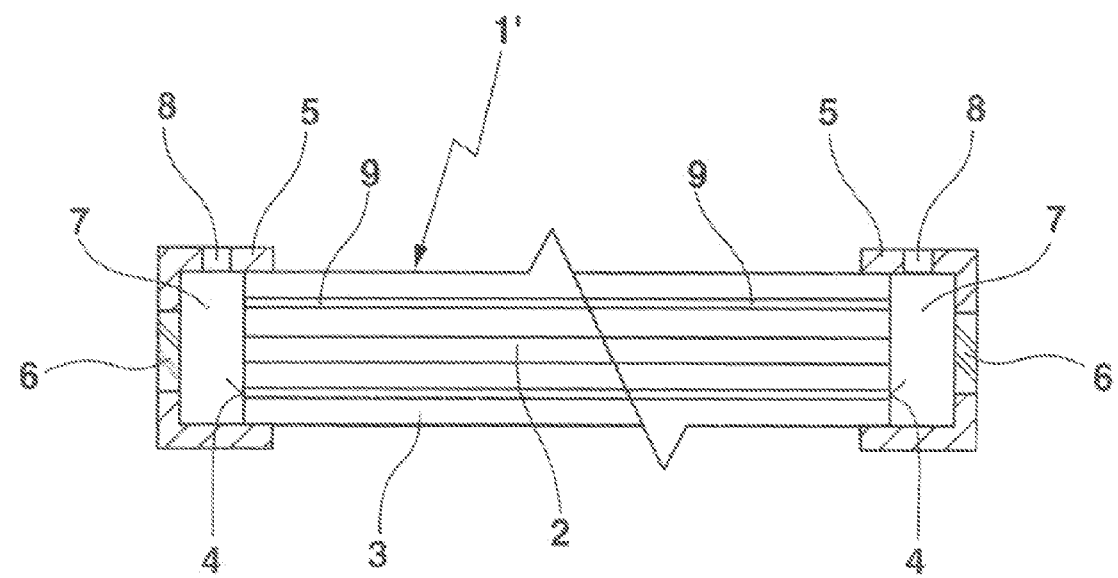
FIG. 2 shows a longitudinal section through a second embodiment of the hollow core optical fiber including a protection element.

The optical fiber 1' shown in FIG. 2 differs from the optical fiber 1 only in that the fiber cladding 3 includes hollow spaces 9 for guiding the light coupled into the fiber core 2. The hollow spaces 9 in the area of the fiber ends 4 are open at their front faces and thus terminate in the intermediate space 7 like the hollow fiber core 2.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An optical fiber comprising:
   a fiber cladding defining a hollow fiber core having an open fiber end face at an end of the fiber, wherein the fiber cladding guides light coupled into the hollow fiber core; and
   a fiber end protection element surrounding the end of the fiber and directly coupled to the fiber cladding in a dustproof fashion to define a closed cavity at the fiber end;
   the fiber end protection element defining a window having a face in front of and spaced from the end of the fiber and being positioned to couple and decouple the light to and from the hollow fiber core.

2. The optical fiber of claim 1, wherein the fiber cladding includes hollow spaces that are open at the front face.

3. The optical fiber of claim 1, wherein the window of the protection element has an antireflection coating on one or both sides.

4. The optical fiber of claim 1, wherein the window of the protection element is flat.

5. The optical fiber of claim 1, wherein the protection element seals the fiber end in a waterproof fashion.

6. The optical fiber of claim 1, wherein the protection element seals the fiber end in an air-tight or gas-tight fashion.

7. The optical fiber of claim 1, wherein the protection element surrounds the end of the fiber in a dustproof fashion by covering the end of the fiber to define a closed cavity at the fiber end.

8. The optical fiber of claim 1, wherein the hollow fiber core and any existing hollow spaces of the fiber cladding that are open at their front faces are filled with gas.

9. The optical fiber of claim 1, wherein the protection element has a housing opening that terminates in an intermediate space between the fiber end and the window.

10. The optical fiber of claim 1, wherein the protection element is made of a material that does not gas out.

11. The optical fiber of claim 1, wherein the distance between the fiber end and the window is in the mm to cm range.

12. An optical fiber system comprising:
a fiber cladding defining a hollow fiber core including fiber ends and front faces of both fiber ends that are open, wherein the fiber cladding guides light coupled into the hollow fiber core, and
a protection element surrounding a fiber end and directly coupled to the fiber cladding in a dustproof fashion to define a closed cavity at the fiber end,
wherein the protection element includes a window at its front face in front of and separated from the fiber end by a distance to couple and decouple the light to and from the hollow fiber core.

13. The optical fiber system of claim 12, wherein the fiber cladding includes hollow spaces that are open at the front faces.

14. The optical fiber system of claim 12, wherein the window of the protection element includes an antireflection coating on one or both sides.

15. The optical fiber system of claim 12, wherein the window of the protection element is flat.

16. The optical fiber system of claim 12, wherein the protection element seals the fiber end in a waterproof fashion.

17. The optical fiber system of claim 12, wherein the protection element seals the fiber end in an air-tight or a gas-tight fashion.

18. The optical fiber system of claim 12, wherein the hollow fiber core and any existing hollow spaces of the fiber cladding that are open at their front faces are filled with gas.

19. The optical fiber system of claim 12, wherein the protection element has a housing opening that terminates in an intermediate space between the fiber end and the window.

20. The optical fiber system of claim 12, wherein the protection element is made of a material that does not gas out.

21. The optical fiber system of claim 12, wherein the distance between the fiber end and the window is in the mm to cm range.

22. A method of protecting a hollow fiber core of a hollow core optical fiber, the method comprising:
surrounding a hollow fiber core with a fiber cladding that guides light coupled into the hollow fiber core,
surrounding an open front face of a fiber end of the hollow fiber core with a protection element,
coupling the protection element to the fiber end and directly coupling the protection element to the fiber cladding in a dustproof fashion to define a closed cavity at the fiber end, and
enabling light to couple into and to decouple out of the hollow fiber core through a front face of a window of the protection element that is separated from the fiber open front face by a distance.

23. The method of claim 22, further comprising forming an antireflection coating on one or both sides of the window of the protection element.

24. The method of claim 22, further comprising sealing the protection element to the fiber end in a waterproof fashion.

25. The method of claim 22, further comprising sealing the protection element to the fiber end in an air-tight fashion.

26. The method of claim 22, further comprising sealing the protection element to the fiber end in a gas-tight fashion.

27. The method of claim 22, further comprising filling the hollow fiber core and any existing hollow spaces of the fiber cladding that are open at their front faces with gas.

28. The optical fiber of claim 1, wherein the hollow fiber core is filled with gas.

29. The optical fiber of claim 1, wherein the fiber end protection element is cap shaped.

30. The optical fiber system of claim 12, wherein the hollow fiber core is filled with gas.

31. The optical fiber system of claim 12, wherein the fiber end protection element is cap shaped.

32. The method of claim 22, further comprising filling the hollow fiber core with gas.

33. The method of claim 22, wherein the protection element is cap shaped.

34. An optical fiber comprising:
a hollow fiber core filled with gas having an open fiber end face at an end of the fiber; and
a cap-shaped fiber end protection element directly coupled to the end of the fiber in a dustproof fashion to define a closed cavity at the fiber end;
the fiber end protection element defining a window having a face in front of and spaced from the end of the fiber and being positioned to couple and decouple the light to and from the hollow fiber core.

35. A method of protecting a hollow fiber core of a hollow core optical fiber, the method comprising:
surrounding an open front face of a fiber end of a hollow fiber core filled with gas with a cap-shaped protection element,
coupling the protection element to the fiber end in a dustproof fashion to define a closed cavity at the fiber end, and
enabling light to couple into and to decouple out of the hollow fiber core through a front face of a window of the protection element that is separated from the fiber open front face by a distance.

* * * * *